(No Model.)   6 Sheets—Sheet 1.
J. W. MEAKER.
FARE REGISTER.
No. 338,426.   Patented Mar. 23, 1886.
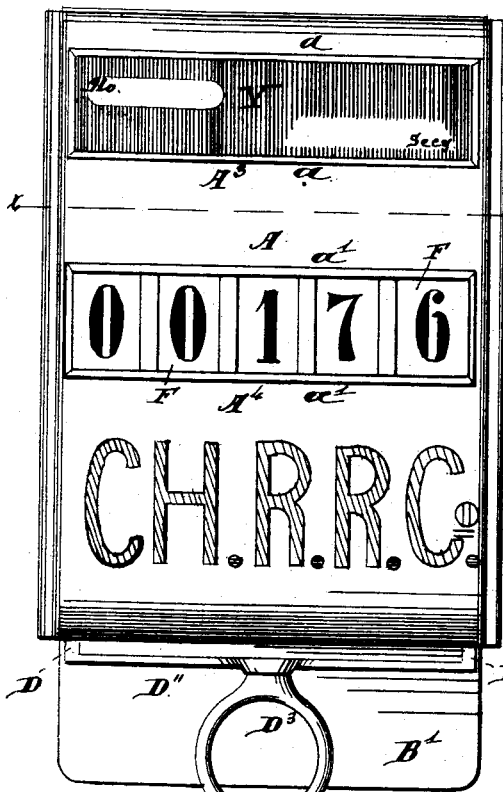
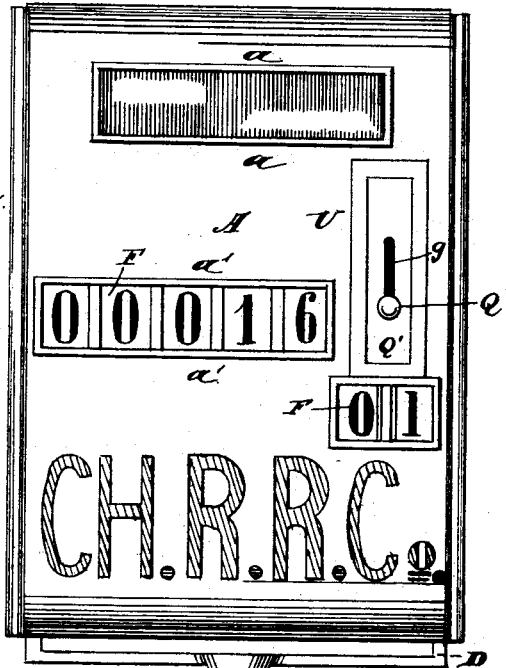
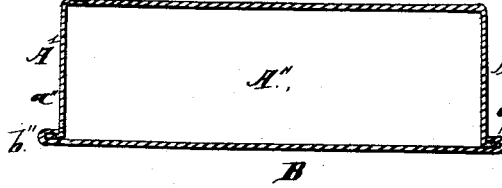
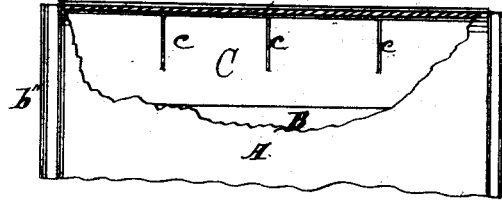
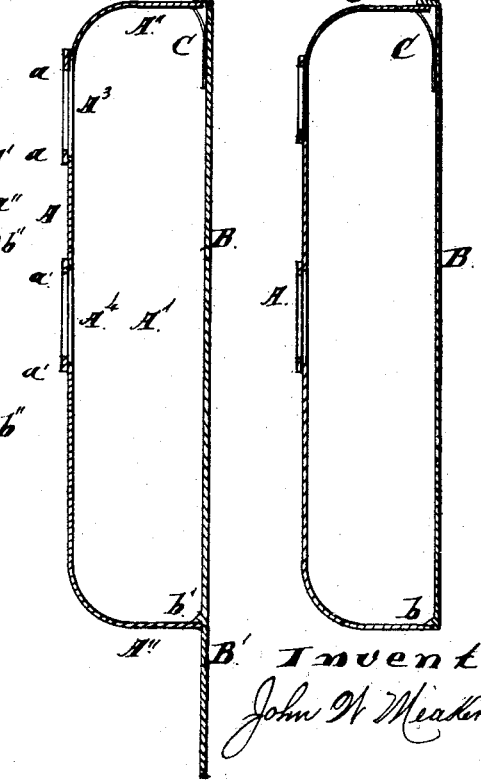
Witnesses:
O. W. Bond
Albert H. Adams
Inventor:
John W. Meaker (No Model.)  
J. W. MEAKER.  
FARE REGISTER.  
No. 338,426. Patented Mar. 23, 1886.
6 Sheets—Sheet 2.
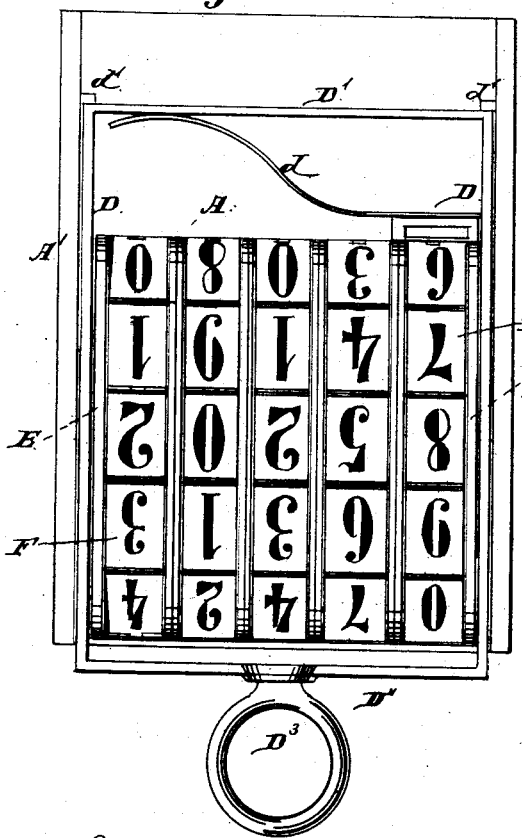
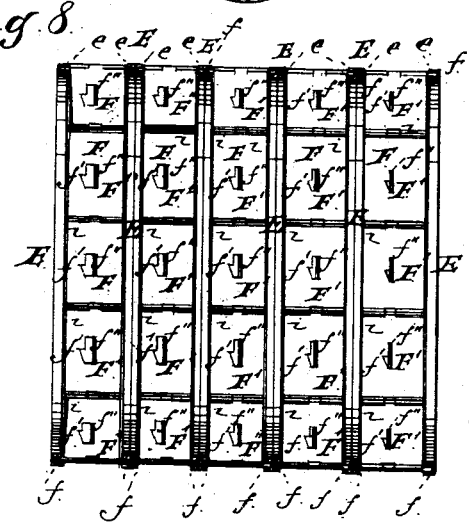
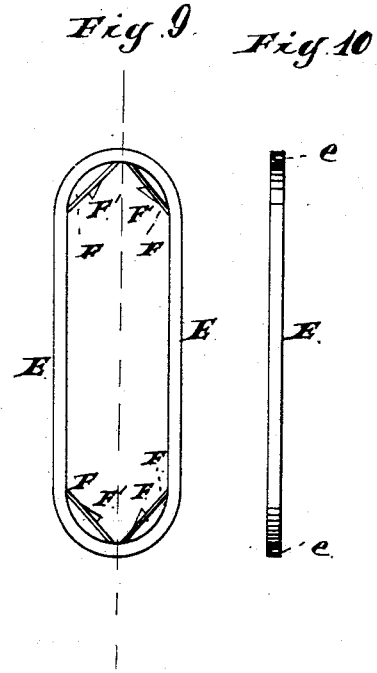
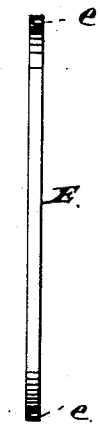
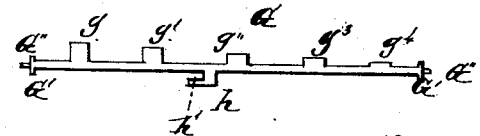
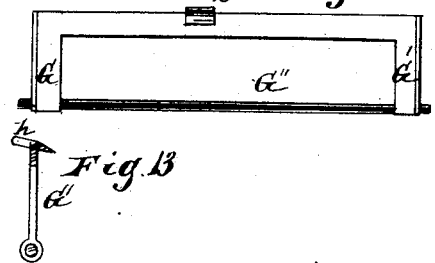
Witnesses:  
O. W. Bond  
Albert N. Adams
Inventor:  
John W. Meaker
N. PETERS, Photo-Lithographer, Washington, D. C.

(No Model.)
J. W. MEAKER.
FARE REGISTER.
No. 338,426.  Patented Mar. 23, 1886.
6 Sheets—Sheet 3.
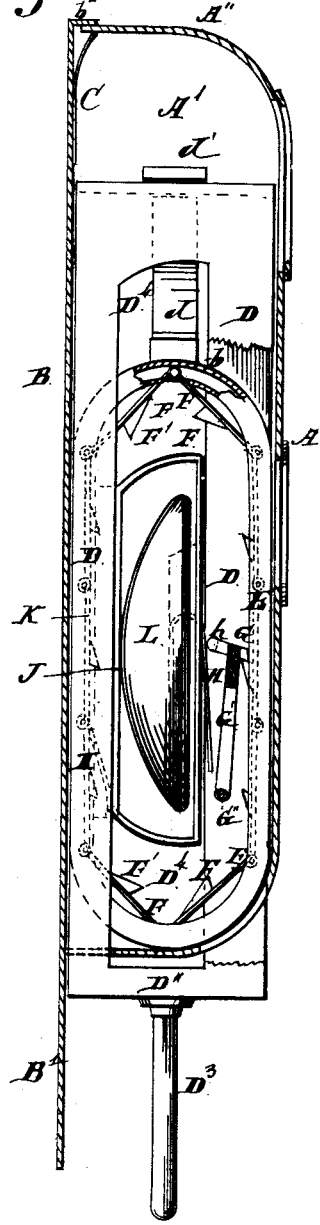
Fig. 14
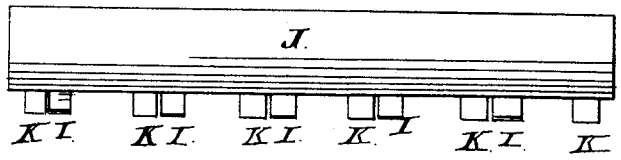
Fig. 15
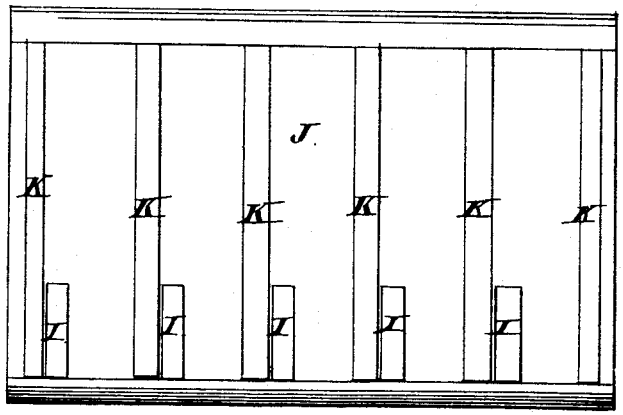
Fig. 16
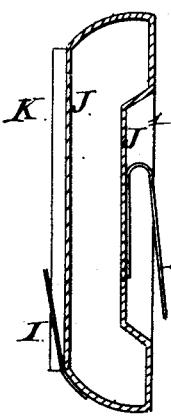
Fig. 17
Fig. 18
Witnesses:
O. W. Bond
Albritt H. Adams
Inventor:
John W. Meaker (No Model.)
J. W. MEAKER.
FARE REGISTER.
No. 338,426. Patented Mar. 23, 1886.
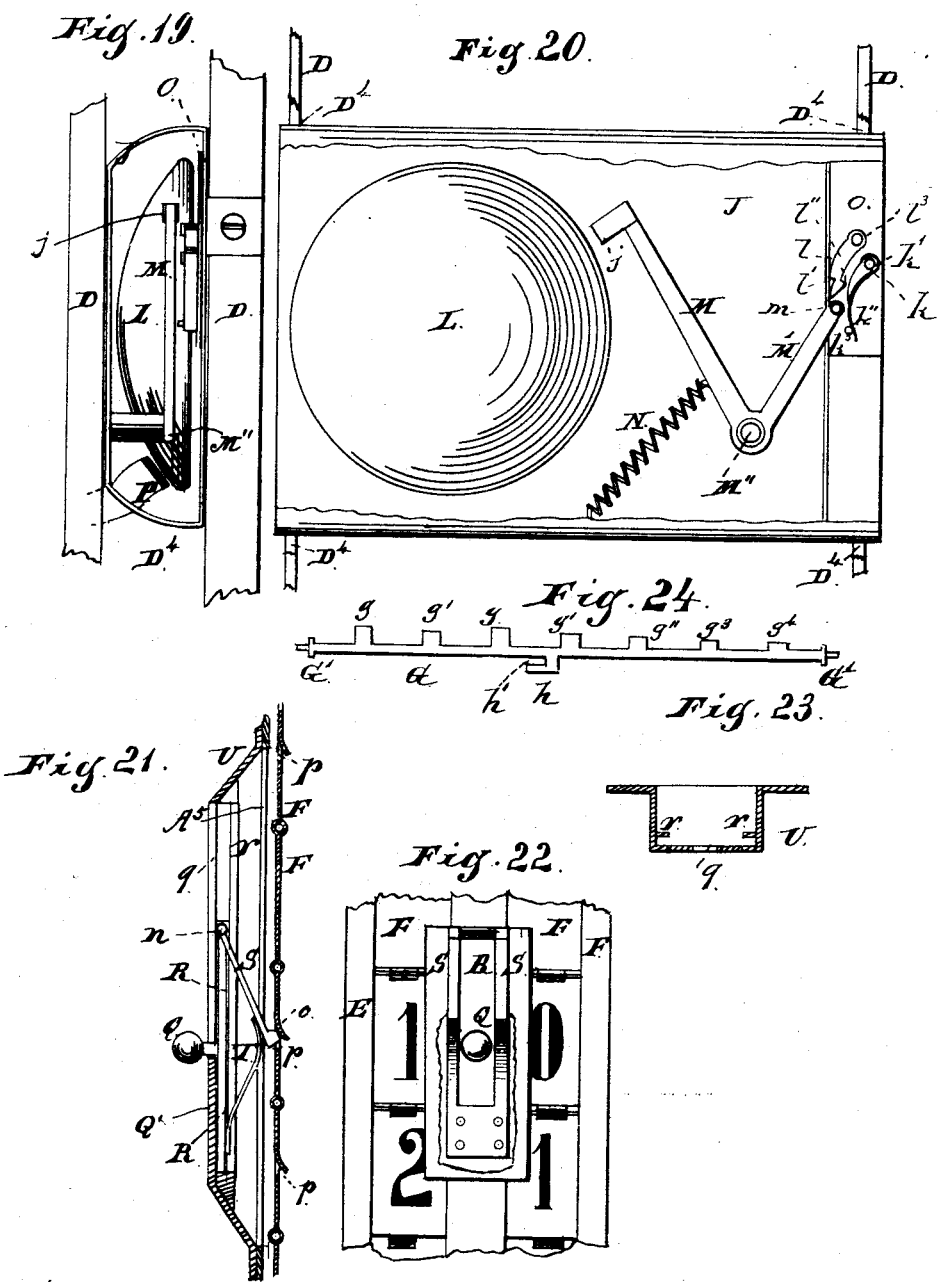

(No Model.) 6 Sheets—Sheet 5.
J. W. MEAKER.
FARE REGISTER.
No. 338,426. Patented Mar. 23, 1886.
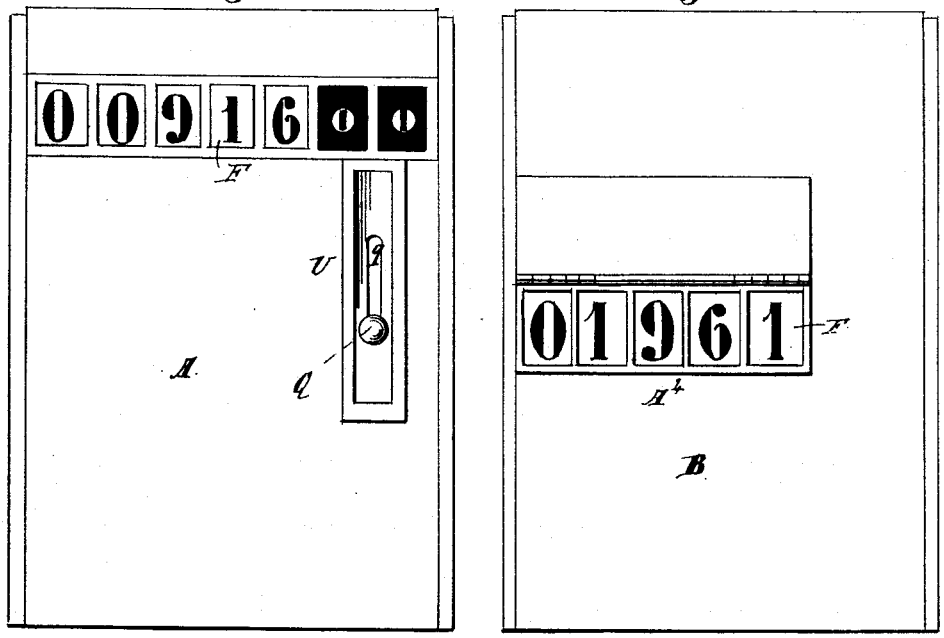
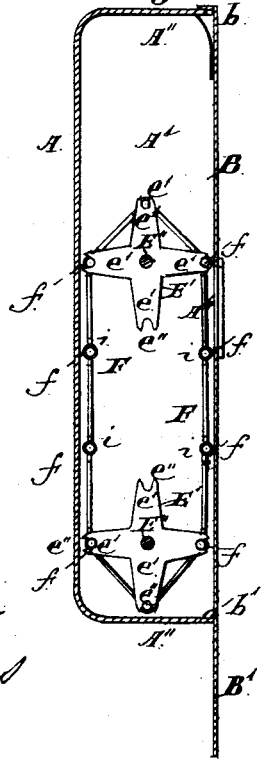
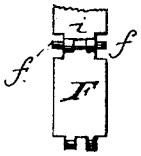
Witnesses:
O. W. Bond
Albert N. Adams
Inventor:
John W. Meaker (No Model.)  6 Sheets—Sheet 6.

J. W. MEAKER.
FARE REGISTER.

No. 338,426. Patented Mar. 23, 1886.

Witnesses:
O. W. Bond
Albert H. Adams

Inventor:
John W. Meaker

UNITED STATES PATENT OFFICE.

JOHN W. MEAKER, OF CHICAGO, ILLINOIS, ASSIGNOR TO THE RAILWAY REGISTER COMPANY, OF SAME PLACE.

FARE-REGISTER.

SPECIFICATION forming part of Letters Patent No. 338,426, dated March 23, 1886.

Application filed April 24, 1885. Serial No. 163,363. (No model.)

*To all whom it may concern:*

Be it known that I, JOHN W. MEAKER, residing at Chicago, in the county of Cook and State of Illinois, and a citizen of the United States, have invented certain new and useful Improvements in Fare-Registers, of which the following is a full description, reference being had to the accompanying drawings, in which—

Figure 29:
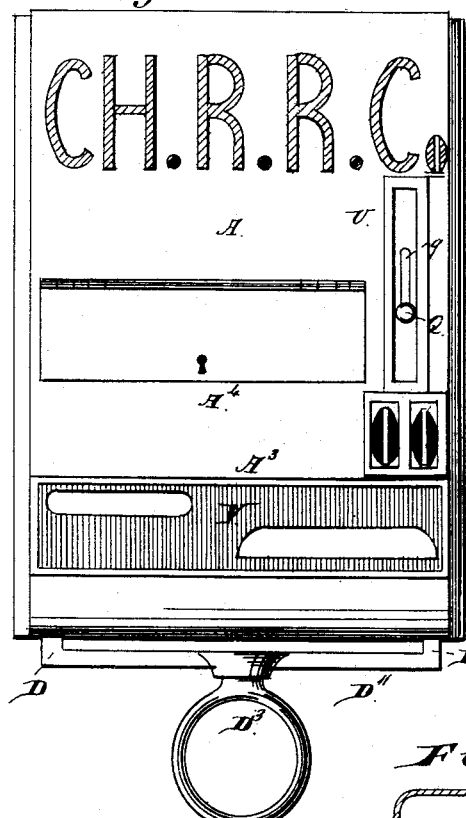
Figure 30:
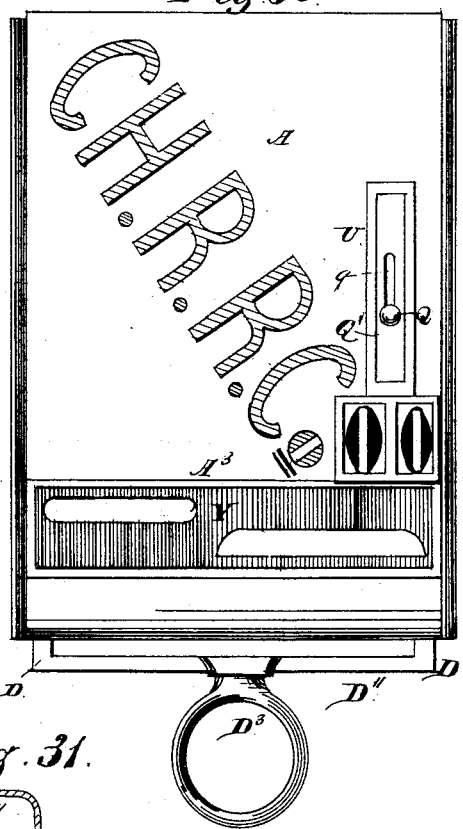
Figure 31:
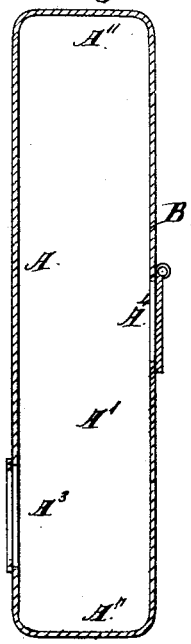

Figure 1 is a face view showing a total-register without a trip-register; Fig. 2, a face view showing a total and a trip register; Fig. 3, a longitudinal section showing the construction of the case with a guard to protect the clothing of the wearer from the pull; Fig. 4, a longitudinal section showing a construction of the case without a guard; Fig. 5, a cross-section showing a form of attaching the back to the case; Fig. 6, a detail showing the retaining-spring for holding the back in place;
Fig. 7, a rear elevation of the pull and registering-chains; Fig. 8, a sectional elevation of the registering-chains and the guides therefor; Fig. 9, a side elevation of one of the chain-guides and chains; Fig. 10, a sectional elevation of a chain-guide; Figs. 11, 12, and 13, details of the dog or catch for operating the chains; Fig. 14, a longitudinal section showing the devices within the case; Fig. 15, an edge elevation of the bell-case; Fig. 16, a side elevation of the bell-case; Fig. 17, a cross-section of the bell-case, showing the spring for holding the dog on the return movement of the pull, and the springs for preventing backward turning of the register-chains; Fig. 18, a detail showing the construction of the spring for holding the chain dog or catch on the return movement, Figs. 14 to 18, both inclusive, are enlarged; Fig. 19, a detail, being an end elevation of the bell and striking devices; Fig. 20, a side elevation with the bell-case broken out to show the bell and striking devices; Fig. 21, a sectional elevation showing the devices for setting the trip; Fig. 22, a front elevation of the devices shown in Fig. 21; Fig. 23, a cross-section of the case for the trip devices; Fig. 24, a top view of the dog or catch when a trip-register is used in addition to the total-register; Fig. 25, an elevation showing the total and trip registers in the same plane; Fig. 26, an elevation showing the sight-opening for the total-register in the back; Fig. 27, a section showing the chains carried by star-wheels; Fig. 28, a detail of the chains of Fig. 27; Fig. 29, an elevation showing the total-register opening closed by a door;
Fig. 30, a front elevation of Fig. 26; Fig. 31, a section of Fig. 30, showing the case only.

The objects of this invention are to present to view numerals of a large size, so as to be readily distinguished by an observer; to dispense with complicated devices heretofore used; to insure a positive progression of the registering-numerals and prevent any tampering with the register as a whole or backward movement of the registering-numerals; to construct and apply a trip-register, the movement of which will coincide with the movement of the units and tens of the total-register, and which can be readily reset for each trip without interfering with the total-register, and to improve generally the construction and operation of the devices as a whole; and its nature consists in the several parts and combinations of parts hereinafter described, and pointed out in the claims as new.

In the drawings, A represents the face of a shell or case, which may be stamped or otherwise formed from a sheet of brass or other suitable material to have side walls, A', and end walls, A''. The face of the case has stamped out therefrom a piece to form a ledge, *a*, leaving an opening, A³, which opening is designed to receive a piece of glass and a paper or other seal, by which each register can be identified, and a second opening, A⁴, is also formed in the face-plate A of the case by cutting out a portion thereof, which opening is surrounded by a flange or bead, a', and receives a glass, through which the numerals of the total-register can be observed. As shown, each side wall, A', has an outwardly-projecting flange, a'', for the reception of the back.

B is the back, cut or otherwise formed from a sheet of brass or other suitable material, and having at one end a turned portion, *b*, to abut against one of the end walls, A'', of the case when the parts are in position, and having on its interior face a lug or projection, b', to abut against the opposite end wall of the case, and, as shown in Figs. 1, 3, 14, and 27, the back B is extended to form a guard, B', to prevent wear of the clothing of the user from the pull. As shown in Fig. 4, this extension B' is omitted. This back B has its side edges turned over to form a recess, b'', which receives the flange a'' and connects the back and case together. The back and case can be connected at the side in some other suitable manner.

C is a spring, formed of a strip of suitable metal, provided, as shown, with slits c to divide the strip into tongues. The strip is soldered, brazed, or otherwise suitably secured to the inner face of the back B, as shown in Figs. 3 and 4, the tongues formed by the slits having an inward spring, so as to bear against the inner face of the end wall, A'', as shown in said Figs. 3 and 4, by which means the withdrawal of the back is prevented, and in order to withdraw the back it will be necessary to break the glass and seal in the opening A³ and insert a suitable piece by which the spring C can be pushed up and disengaged from the end wall, A''. A space is left between the inner face of the back and the edge of the end wall sufficient for the passage of the spring C, the spring bearing, when the parts are together, on the end wall below the space.

D represents side bars of a frame having at one end a cross-bar, D', and at the other end a cross-bar, D'', the cross-bar D', when the parts are together, lying within the shell or case A, and the cross-bar D'' outside of the end wall of the case, the side bars, D, running in suitable slots or openings formed in the end wall, and to the cross-bar D'' is attached a ring or other device, D³, which can be grasped by the user of the register, to draw down the frame formed by the side bars, D, and end bars, D' D'', which frame constitutes the pull of the register. Each side bar, D, is provided with a slot, D⁴, to allow the frame to reciprocate or move in and out past an interior bell case or shell, J, and, as shown, the upward or inward movement of the frame is limited by a stop, d', located on each side wall, A', of the case, and a spring, d, is provided for returning the pull after it has been drawn down to advance the register, which spring has its free end bearing on the inner face of the cross-bar D', and, as shown, its other end is attached to a support on the guide-bars for the register-chains, and in the form of arrangement shown the spring is at the upper or top end of the register; but it is evident that such spring could be located and operate at the bottom or lower end of the register.

E represents the guides for the register-chains, each guide having straight sides and curved ends, as shown in Fig. 9, and each guide being provided with a groove, e, for the pintles on the register-chains to travel in, and each guide is of the required length for a length of chain having ten links to travel around and present the numerals to view at the sight-opening A⁴ of the case.

F represents the chains carrying the numerals for the total-register, each chain being formed of a series of ten links, to have thereon the numerals from nought to nine, both inclusive, which numerals are located on the exterior face of the chain-links, and, as shown, the links are hinged together at i by a suitable pin, f, the ends of which project beyond the edges of the chain on each side to form the pintles which enter the groove or recess e in the guides E for the respective chains. The register shown has five of these chains, so as to register units, tens, hundreds, thousands, and ten thousands; but the number of chains can be increased or decreased, as may be desired, for the total number for which the register is to be adapted. The full face of each link can be used for the display of the numeral, thus enabling a large sized numeral to be employed, the size depending solely on the size of the link. Each link of each chain has on its reverse side a projection or catch, F', nine of which have a stop-face, f'', and an engaging-face, f', and one of which has its engaging-face f' extending to the face of the chain-link without an interposed stop-plate, f'''. The catches F' are graded to have the stop-face increase in width from the units-chain to the last chain used—that is to say, if the stop-face of the catches F' of the units-chain is a thirty-second of an inch rise from the face of the chain, those of the tens-chain will be two thirty-seconds, those of the hundreds, three thirty-seconds, and so on to the limit of the number of chains, except that in each instance the catch F', which has an engaging-face, f', extending to the face of the link, will have no stop-face f''', and this catch F' is to be located on that link of each chain which comes in relation to the dog or catch by which the chains are driven to cause the dog to act, and bring the nought-link on the chain in view before the opening. The catches F' on the respective chains are arranged in horizontal lines, to have the engaging-face f' of each catch in the same plane on all the chains. The chains have a progressive movement intermittingly, and at the completion of a full revolution of each chain the next succeeding chain is advanced one link—that is, when the units-chain has completed a revolution, the tens-chain will be caught and the two chains thrown forward together, bringing into view the figure 10, the nought being on the units-chain and the one on the tens-chain, and when the units-chain has made ten complete revolutions, the hundreds and tens and units chains will be advanced simultaneously, bringing into view three numerals, and so on until the limit of the number of chains is reached. As shown, the intermediate supports, E, for the chains are doubled, or placed back to back, and the outer supports are single.

G is a dog or catch for advancing the chains, which dog or catch is formed of a bar having thereon a series of projections corresponding to the number of chains, five being provided, as shown in Fig. 11, to coact with the five chains shown in Fig. 8, the projection g engaging the catches F' on the units-chain, and the projection $g'$ the catches F' on the tens-chain, $g''$ on the hundreds, $g^3$ on the thousands, and $g^4$ on the ten-thousands; and it will be observed that these projections $g$, $g'$, $g''$, $g^3$, and $g^4$ are graded correspondingly to the gradation of the catches F'—that is, each projects a thirty-second of an inch farther than the next adjacent one, $g$ being the longest and $g^4$ the shortest, by which arrangement it will be seen that when $g$ is engaged with the catches F' of the units-chain, which have the stop-faces $f''$, the remaining projections will not engage with the catches of their respective chains until the catch which has no stop-face comes into position, allowing the projection $g$ to pass farther in, so that the projection $g'$ can engage the catch F', and so on for the other chains. This bar or dog G has at each end an arm, G', in which is secured a spring, G'', which has a torsional action, and the ends of the spring project beyond the ends of the arms G' to enter the side bars, D, of the pull, so that as the pull is drawn down the dog or catch will also be drawn down. The dog G is located crosswise of the chain and in the interior space, so as to have its projections engage with the projections on the chain links, which projections are on the inner face of each link, and the dog is thrown forward to engage with the chains by the torsion of the spring G'', and on the return movement of the pull the dog rides up on the inclined face of the respective projections F', to be thrown over and engage with the face $f'$ of the catch.

H is a guard-spring, the free end of which is thrown out to engage the end of a projection, $h$, on the dog G, and have such projection pass down the face of the spring. This spring is formed, as shown in Fig. 18, with its free end somewhat wider than the attached end, for the projection $h$ to ride on the extended portion, and after passing the end of the spring, the spring is thrown out so as to enter a slot, $h'$, in the projection and hold the dog G out from engagement on the return movement of the pull, and the length of the portion of the spring which co-acts with the projection $h$ is less than the length of stroke of the pull, so that the projection will clear the spring at the end of the pull and at the return movement, and on the return movement the projection $h$ engages with the spring H, holding the dog out against the twisting of the torsion-spring to throw it in until the dog approaches the point where it is to be thrown in to engage the catch F'.

I is a series of springs corresponding in number to the number of chains and arranged to have their free end come beneath a stop on the chain and prevent backward turning of the register, and, as shown in Fig. 14, the stop on the chain is formed by the hinge $i$, between the chain-links, against which the end of the spring comes in case an attempt is made to turn the chains back.

J is a shell or case located in the space between the chains, and corresponding in depth to the width of the slot $D^4$ in the form of construction shown, and, as shown, the front face of this shell is depressed to form a recess, J', in which is located the spring H, and the springs I are attached to the exterior of this shell or case J, to project outward therefrom at the back, as shown in Fig. 17.

K represents stringers or risers secured to the rear wall of the case J and forming a support, to which the guides E are secured, a stringer being provided for each series of guides, the intermediate stringers supporting two guides. These stringers support the guides sufficiently far removed from the case J to allow the chains to travel without liability of the projections F' striking the wall of the case, and, as shown, the lower end of the guides is supported by the lower wall of the case A, but, if desired, the guides could be secured by screws or otherwise to the case. The dog G shown works between the front wall of the case J and the chains on that side, as shown in Fig. 14.

L is a bell secured in any suitable manner within the interior of the case or shell J.

M is a lever having an arm or extension, M', and pivoted at M'' to the wall of the case J, so as to have its end $j$ strike the bell L, as shown in Fig. 20.

N is a spring, one end of which is attached to the arm M and the other to the case J, which spring acts to throw the end $j$ of the arm M down to strike the bell.

O is a plate attached to one of the side bars, D, of the pull in such relation as to lie within the front wall of the shell J in the arrangement shown, and slide on the shell with the movement of the pull, for which purpose the edge of the case J has a portion thereof cut out underneath the plate O. This plate has pivoted thereto a pawl, $k$, by a suitable pin or pivot, $k'$, and this pawl rests upon a spring, $k''$, the free end of which engages with a pin, $k^3$, on the plate, by which the pawl is returned to its normal position after the bell has been rung, and adjacent to this pawl $k$ is another pawl, $l$, attached to the plate O by a suitable pin or pivot, $l^3$, which pawl near its free end has a shoulder, $l'$, on its exterior edge, and a shoulder, $l''$, on its interior edge, as shown in Fig. 20, and between these pawls a pin, $m$, on the arm M' of the bell-lever, passes to throw the arm M up as the plate O is pulled down with the pull on the register, the limit of the backward throw of the arm M being to a point where the pin $m$ passes around the pivot end of the pawl $l$, and as the pin passes around the end of the pawl the spring acts and throws down the hammer $j$, causing the bell to ring.

P is an arm attached to one of the side bars, D, and having on its end adjacent to the bell a cushion of soft material, which prevents any accidental or intentional ringing of the bell except from the hammer $j$.

The parts so far described complete the total-register proper, but where a trip-register is desired in addition to a total-register the following devices are added: The units and tens chains are duplicated, and the catch or dog G extended, and the projections $g$ $g'$ duplicated to engage with the duplicate chains forming the trip-register, to do which the chains may be made of less width, so as to fit within the same case as the total-register, or the case for the trip-register may be made wider to receive the two additional chains.

The trip-register has to be reset for every trip, and this can be accomplished with the arrangement shown by the following devices: Q represents a knob projecting through the face of the case, to be taken hold of by the user, and, as shown, an opening, $A^5$, is formed in the case and closed by a plate, $Q'$, in which is a slot, $q$, for the stem of the knob Q.

R is a plate to which is secured the knob Q, which plate works in a guide formed on the interior of the frame supporting the plate.

S represents dogs, one for each side of the plate R, and pivotally attached at their upper ends to the upper end of the plate, and so arranged as to engage, respectively, one with the units-chain and the other with the tens-chain of the trip-register, as shown in Figs. 21 and 22. Each dog at its lower end has a projection, $o$, which can drop into a recess or opening, $p$, formed in each chain-link, so as to engage with the chain-link, and advance the chain as the knob Q is pulled down, as shown in Fig. 21.

T represents springs—one for each pawl S—and attached to the plate R in any suitable manner, so as to have the free end engage with the rear face of the dog, to project the free end of the dog forward.

U is the case or frame supporting the plate R, the plate, as shown, running in grooves formed by flanges $r$ and the front wall of the frame U, as shown in Fig. 23. The frame U can be a separate piece, brazed or otherwise firmly secured to the front of the case A, or such frame could be stamped from the body of the front. The chains forming the trip-register are advanced simultaneously with the units and tens chains of the total-register, and when the end of the trip is reached the trip-register is reset by the user pulling down on the knob Q until he brings the noughts of the units and tens chains into position before the sight therefor in the case, which is done by the engagement of the pawls S with the chains of the trip-register, and such advance of the trip-register chains will not advance any of the chains of the fare-register.

V is the seal to be used by the company for preventing tampering with the register, which seal is placed beneath the glass in the opening $A^3$ after the registering devices have been put in the case and before the back is inserted. This seal may be a piece of paper on which the number of the register can be written, together with the name of some officer of the company, if so desired, and if desired the seals can have a definite color for each line of street-railway where the company runs several, the colors of the seals corresponding with that of the light carried by the car.

The chains, bell, and operating devices for the chains and bell are to be put together within the pull, and the pull and the registering devices inserted in the case or shell to bring the numerals in proper relation to show the figures at the sight-opening $A^4$; but the cover is not attached at the factory unless so desired, the register and the cover or back being shipped to the company—that is, to use the same so that a seal can be applied by some officer of the company at the opening $A^3$, after which the back is slipped into place for the spring C to engage the end wall and hold the cover in position to lock the register, so that access cannot be had to the interior for the purpose of changing the register to show a false register or for other purposes, without first breaking the glass and seal to allow access to be had to the spring to disengage the same from the case to remove the back.

The use will be readily understood from the foregoing description. After the register has been sealed and the back inserted it is ready for use, and in use each pull down of the side bars, D, advances the units-chain one link for nine consecutive pulls, and for the tenth pull both the units and the tens chains will be advanced simultaneously, after which, for nine pulls, the units-chain alone advances. The two chains advance simultaneously, one link at each tenth pull, and when the units-chain has been advanced ninety-nine links, the one hundredth pull advances the units, tens, and hundreds chain one link simultaneously, and when the units-chain has been advanced for the one-thousandth pull, this chain and the tens, hundreds, and thousands chains will advance simultaneously, and so on up to the total series of chains. Each downward pull of the bars D carries with it the plate O, carrying the dogs $k$ $l$, causing the pin $m$ to pass between the dogs, to ring the bell as the pin passes around the pivot end of the dog $l$, and the bell is not prevented from ringing by the stop P, for the reason that such stop is carried away from the bell by the bars D; but this stop acts and prevents a ring of the bell, except as it is withdrawn by the action of the bars D. The bell will not ring unless a complete pull is made, for the reason that a partial pull will cause the pin to engage with either the notch $l'$ or the notch $l''$, according as the pin passes outside or inside of the pawl $l$. The trip-register at first will have its chains advanced each link successively simultaneous with the advance of the links of the units and tens chains of the total-register, displaying on the trip-chains corresponding numbers to that displayed on the units and tens chains of the total-register, and at the completion of the trip the trip-register chains are reset by means of the thumb-piece Q and dogs S, which act to carry the chain around until the noughts thereon are brought to view in the sight-opening, and such resetting of the trip-register will not affect the total-register.

A trip-register can be produced by covering the chains of the total-register, except the units and tens chains, with a hinge or other form of cover, in which case the units and tens will show for themselves the amount of fare taken on each trip by simply keeping a register of the preceding trip and taking such number from the total of the trip made as registered, to do which it may be necessary in some cases to refer to the hundreds-chain by the inspector; or the face-opening in the case for the inspection of the numerals can be entirely closed by a hinge or other cover, and a sight-opening be provided in the back, by which an inspection could be had from that side to determine the number of fares taken.

The guides E might be dispensed with, and in lieu thereof wheels E', mounted on cross-shafts E'', be used, as shown in Fig. 27. Each wheel is formed of four arms or spokes, e', in the end of which is a notch, e'', to receive the pintle f of the chain-link, and with this form of construction the edges of the chain at the joint end are cut away on each side of the pintle to allow the end of the arm or spoke to enter for the notch e'' to engage with the pintle. The wheels are loose on the shaft, so as to turn, but are held against end movement by a pin and groove, or in some other suitable manner.

It will be observed that with a variation of a thirty-second of an inch in both the catches on the chain and the projections on the dog, an engaging-face of a sixteenth of an inch is produced; but the variations can be varied from this to produce a longer engaging-face, if so desired, and the relation between the pull-catch on the respective chains and the projections on the dog, which operate the respective chains, is one that will advance two chains simultaneously at each tenth pull, three chains at each hundredth pull, four chains at each thousandth pull, and five chains at each ten thousandth pull, and so on to the full number of chains used, and the full-face dog on each chain is located on that link of each chain which will throw into view the nought-link of the chain.

The trip-register chains each have a link without a notch in its edge, the face of the link being left full, so that the dog by which the chains are advanced to reset the trip can ride thereover without advancing that chain, while the other chain can be advanced, and this full link is one that is in such relation to the chain as to leave in view the nought-link of the chain—that is, the dogs will advance each chain until the nought-link is brought to view at the sight-opening, after which the dogs will ride over the full link without advancing the chains. The trip and total register only move in unison in regard to the numerals displayed on the chains for the first start of the register, and after that the numbers displayed by the trip will be different from those displayed by the units and tens chains, unless by chance the two series of chains should start on an even hundred, as the total-register proper moves continuously forward without resetting, while the trip-register is reset for each full trip.

As shown, the back is slid in from the top, but it is evident that the back could be slid in from the bottom, in which case the position of the spring C would have to be reversed and the position of the seal would be at the bottom, as shown in Figs. 29 and 30, instead of at the top, and when the seal is located at the bottom of the case the entire pull will be inclosed in the case, leaving only the stem, which is taken hold of to operate the pull, projecting below or outside of the shell, and with this construction the spring $d$, instead of being at the top of the case to act on the top bar of the pull, will be at the bottom of the case to act on the bottom cross-bar of the pull, which bar is wholly within the case.

The total and trip register numerals could be located in the same plane, as shown in Fig. 25, in which case the numerals of the total-register may be black on a white face and those of the trip-register white on a black face, or vice versa, so long as the numerals of the two registers are in contrasting colors, and, if desired, the register can have combined therewith indicating words to show in which direction the car is running.

The sight-opening for the total-register can be located on the back or rear face of the case and be covered by a door, as shown in Fig. 26, or left open with the trip-register on the front of the case, as shown in Fig. 30, in which event the space on the front of the case can be utilized by indicating-letters for the line of street-railway on which the register is to be used, if so desired, as shown in Fig. 30, and the opening for viewing the total-register when formed in the front of the case can be closed by a door or flap, as shown in Fig. 29, and when the total-register opening is on the back, as shown in Figs. 26 and 30, the trip-register only is exposed to the view of the passengers.

The seal and the opening therefor is not shown in Fig. 25, but is to be located as shown in Figs. 29 and 30, and in Figs. 27 and 28 the stops F' on the chain-links are not shown, but such stops are to be located as shown in Fig. 8, and these stops F' can be formed by cutting pieces of the link and turning such pieces inward to form an engaging-face and a stop-face, as described; or they could be formed by stamping the metal so as to produce a raised portion to form the engaging-face and the stop-face for each catch; or such stops can be formed in any other suitable manner that will be sufficiently firm to withstand the strain of the pull in use.

What I claim as new, and desire to secure by Letters Patent, is—

1. The combination, with a series of progressively-moving chains, each link having a numeral on its front face and a catch on its rear face, of a dog or catch having a series of projections to engage the catches on the chains and a pull for operating the dog or catch, substantially as and for the purpose specified.

2. A series of chains, F, each link having on its front face a numeral and on its rear face a catch, F', and guides E, in combination with the side bars, D, and dog G, having a series of projections to coact with the catches F', substantially as and for the purposes specified.

3. A series of chains F, each link having on its front face a numeral and on its rear face a catch, F', in combination with a bar, G, having a series of catches to coact with the catches of the respective chains to advance the chains intermittingly, substantially as and for the purposes specified.

4. A series of chains, F, each link having on its front face a numeral and on its rear face a catch, F', the catches forming a graded series in relation to each other, substantially as and for the purpose specified.

5. A shell or case, in combination with a series of chains, F, each link having a numeral on the front face and a catch on its rear face, guides E, bar or dog G, having a series of projections to engage the catches F', and a pull for advancing the chains intermittingly, substantially as and for the purpose specified.

6. The bars D, slide O, carrying pawls $k\ l$, in combination with the bell L, lever M M', and spring N, for sounding the bell at each registration and preventing the bell from being struck by a half-pull or otherwise, substantially as specified.

7. The combination of the bars D, slide O, carrying pawls $k\ l$, the arm P, having a deadening material on its end, the bell L, and spring-lever M M', for sounding the bell at each registration and preventing its ringing except by the hammer, substantially as described.

8. The combination, with the chains of a trip-register, said chains being provided with graduated stops and pawls adapted to engage therewith, of the knob Q, plate R, and dogs S, for resetting the chains, substantially as described.

9. The combination, with the chains of a trip-register, said chains being provided with graduated stops and chain-actuating pawls adapted to engage said stops or catches, of the knob Q, plate R, dogs S, and springs T, substantially as described.

JOHN W. MEAKER.

Witnesses:
O. W. BOND,
ALBERT H. ADAMS.